(12) United States Patent
Korsten et al.

(10) Patent No.: US 8,192,808 B2
(45) Date of Patent: Jun. 5, 2012

(54) APPARATUS AND METHOD FOR MANUFACTURING AN OPTICAL PREFORM

(75) Inventors: Marco Korsten, Eindhoven (NL); Marc Jansen, Winteire (NL); Eric Aloysius Kuijpers, Eindhoven (NL)

(73) Assignee: Draka Comteq, B.V., Amsterdam (NL)

( * ) Notice: Subject to any disclaimer, the term of this patent is extended or adjusted under 35 U.S.C. 154(b) by 1051 days.

(21) Appl. No.: 12/107,217

(22) Filed: Apr. 22, 2008

(65) Prior Publication Data
US 2008/0268174 A1 Oct. 30, 2008

(30) Foreign Application Priority Data
Apr. 26, 2007 (NL) .................................. 1033763

(51) Int. Cl.
*C23C 16/513* (2006.01)
(52) U.S. Cl. .............. 427/578; 65/417; 65/419; 65/483; 118/715; 385/123; 427/163.2; 427/237
(58) Field of Classification Search .................. 427/578, 427/164, 237, 163.2, 248.1; 118/665, 725, 118/730, 733, 715; 65/158, 160, 417, 419, 65/483; 385/123
See application file for complete search history.

(56) References Cited

U.S. PATENT DOCUMENTS

| | | | | |
|---|---|---|---|---|
| 4,280,829 A * | 7/1981 | Sheth | ............................... | 65/158 |
| 6,600,769 B2 | 7/2003 | Simons et al. | | |
| 2003/0164007 A1 | 9/2003 | Simons et al. | | |
| 2004/0163417 A1 | 8/2004 | Simons et al. | | |
| 2004/0237593 A1 | 12/2004 | Van Stralen et al. | | |
| 2005/0120751 A1 | 6/2005 | Simons et al. | | |
| 2007/0003197 A1 | 1/2007 | Matthijsse et al. | | |
| 2007/0289532 A1 | 12/2007 | Hartsuiker et al. | | |
| 2008/0031582 A1 | 2/2008 | Gonnet et al. | | |
| 2008/0044150 A1 | 2/2008 | Terpsma et al. | | |
| 2008/0063812 A1 | 3/2008 | Deckers et al. | | |
| 2008/0268174 A1 | 10/2008 | Korsten et al. | | |

FOREIGN PATENT DOCUMENTS

| | | |
|---|---|---|
| EP | 1988062 A1 | 11/2008 |
| FR | 2253723 | 7/1975 |
| FR | 2266668 A | 10/1975 |
| KR | 102004013610 A1 | 2/2004 |
| WO | 89/02419 A | 3/1989 |

OTHER PUBLICATIONS

European Search Report in counterpart European Application No. 08007135, dated Jul. 31, 2008 [All documents listed in Search Report previously cited in IDS filed on Jun. 16, 2008].
Dutch Search Report and Written Opinion in corresponding Dutch Application No. 1033763, dated Dec. 10, 2007.
Commonly owned pending U.S. Appl. No. 11/939,931, filed Nov. 14, 2007.

* cited by examiner

*Primary Examiner* — Mathieu D. Vargot
(74) *Attorney, Agent, or Firm* — Summa, Additon & Ashe, P.A.

(57) ABSTRACT

The present invention relates to an apparatus and related method for manufacturing an optical preform. The present invention embraces a novel insert tube that is strategically positioned within a quartz substrate tube during the internal vapor deposition process.

21 Claims, 1 Drawing Sheet

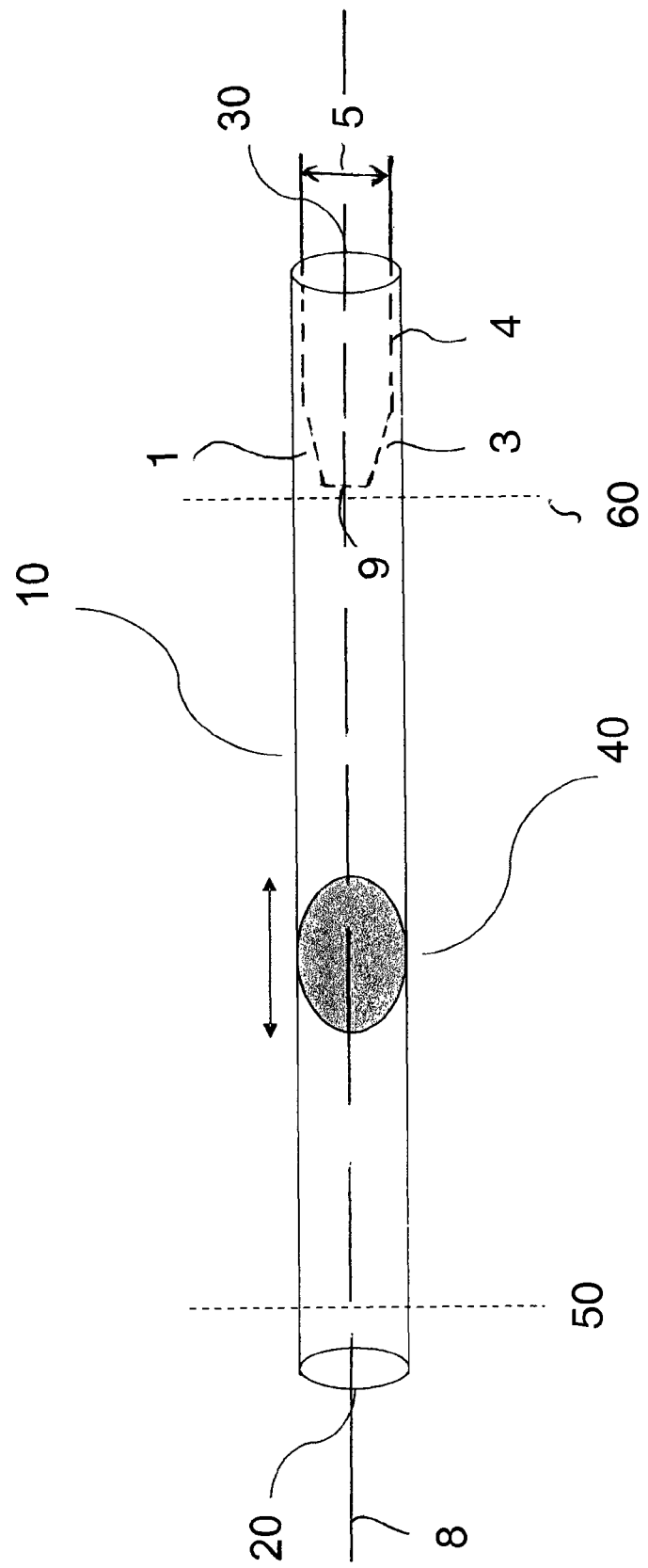

APPARATUS AND METHOD FOR MANUFACTURING AN OPTICAL PREFORM

CROSS-REFERENCE TO PRIORITY APPLICATION

This application claims the benefit of pending Dutch Application No. 1033763 for Device and Method for Manufacturing an Optical Preform (filed Apr. 26, 2007, at the Dutch Patent Office) via 35 U.S.C. §119. Dutch Application No. 1033763 is hereby incorporated by reference in its entirety.

FIELD OF THE INVENTION

The present invention relates to an apparatus and a method for manufacturing an optical preform using an internal vapor deposition process. The apparatus includes an energy source and a hollow, quartz substrate tube. The substrate tube has a supply side, through which glass-forming precursors are supplied to the substrate tube's interior, and a discharge side, from which components that have not been deposited on the substrate tube's interior are discharged. The energy source is movable along the length of the substrate tube between a reversal point at the supply side and a reversal point at the discharge side.

BACKGROUND OF THE INVENTION

Methods of making optical performs are known. For example, an optical preform may be made according to a Modified Chemical Vapor Deposition (MCVD) process, such as described in Korean Patent Publication No. KR 102004013610. This kind of deposition is performed by injecting gases into the annular space formed between an insert tube and a discharge tube. The insert tube is disposed within the discharge tube and, along its length, has a constant diameter that is smaller than that of the discharge tube. Disposed within the insert tube is a soot-scraping element that includes a bar, which rotates in the interior of the insert tube and is in contact with the insert tube's inner surface (i.e., interior diameter).

International Application No. WO 89/02419, which is hereby incorporated by reference in its entirety, discloses a device for manufacturing an optical preform using an internal vapor deposition process. A tubular element is mounted at the pump side of a substrate for the removal of solid, undeposited particles. In particular, such a device includes a screw structure that follows the inner surface of the tubular element. The screw structure includes a gas conduit provided with orifices, preferably a pipe wound in the form of a spiral.

French Publication No. FR 2,266,668 and French Publication No. FR 2,253,723, each of which is hereby incorporated by reference in its entirety, disclose methods for manufacturing optical preforms.

As will be known by those having ordinary skill in the art, during the deposition of doped or undoped glass layers in the interior of a hollow glass substrate tube (e.g., Plasma Chemical Vapor Deposition or PCVD process), layers of low-quality quartz may be deposited, particularly in the region outside the path of reciprocation of the energy source moving along the length of the substrate tube (i.e., the resonator). Such low-quality quartz layers include so-called soot rings and quartz having high internal stress caused by high dopant content.

Moreover, plasma generated in the resonator can migrate slightly outside the resonator, resulting in a poorly defined plasma region, especially on the discharge side of the hollow substrate tube. Such plasma regions lead to inferior glass deposition at both reversal points, but particularly near the discharge side of the substrate tube. This gives rise to problems, such as preform fracture.

There is a need for an improved device for manufacturing an optical preform using an internal vapor deposition process that eliminates one or more of these aforementioned problems.

SUMMARY OF THE INVENTION

The present inventors have found that deposition of low-quality quartz may adversely affect the substrate tube. In particular, the formation of gas bubbles in the deposited glass layers can cause problems (e.g., foaming, clogging, and/or layer cracking) when the hollow substrate tube is subsequently collapsed into a solid preform.

Moreover, the present inventors have found that low-quality quartz may come loose from the interior of the hollow substrate tube during the collapsing process. This can lead to contamination and/or formation of gas bubbles elsewhere in the substrate tube.

Yet another undesirable aspect is that cracks in the low-quality quartz region may propagate toward the center of the substrate tube.

The low-quality quartz may also lead to the formation of low-density soot and thus clogging, especially at the substrate tube's discharge side. This, in turn, can undesirably increase pressure during the internal deposition process. In practice, this adverse effect is seen as white color.

The substrate tube of the present invention is made of high-quality quartz. In practice, the total length of the substrate tube will be greater than the part of the substrate tube that will be converted into a glass fiber during the subsequent drawing process. In this regard, the two ends of the substrate tube, where the deposition takes place, may cause undesirable side effects (e.g., deposition defects, contamination, formation of bubbles and the like) such that the two ends of the substrate tube are not being suitable for forming an optical fiber.

Accordingly, in one aspect, the present invention embraces an apparatus and related method for manufacturing an optical preform using an internal vapor deposition process that eliminates one or more of the aforementioned problems.

In another aspect, the present invention embraces an apparatus for manufacturing an optical preform using an internal vapor deposition process in which no cracking of the glass layers or other undesirable effects occur during the collapsing process (i.e., in which the hollow substrate tube with deposited glass layers is converted into a solid preform).

The foregoing, as well as other characteristics and advantages of the invention and the manner in which the same are accomplished, is further specified within the following detailed description and its accompanying drawing.

BRIEF DESCRIPTION OF THE DRAWING

FIG. 1 schematically depicts an apparatus for manufacturing an optical preform.

DETAILED DESCRIPTION

As noted, the invention embraces an improved apparatus for making an optical preform via an internal vapor deposition process.

Those having ordinary skill in the art will understand that, with respect to an internal vapor deposition process, a glass substrate tube defines a supply side through which glass-forming precursors are supplied to the substrate tube's interior and a discharge side from which unreacted glass-forming precursors (i.e., that have not been deposited on the substrate tube's interior surface) are discharged. Such a glass substrate tube typically possesses a substantially constant internal diameter.

Accordingly, in one aspect the apparatus of the present invention includes an insert tube (e.g., a glass insert tube) that is disposed within the substrate tube's interior, typically at or near the substrate tube's discharge side. The insert tube includes a central portion, which is typically uniformly cylindrical, and a truncated cone portion, which is not. As will be appreciated by those having ordinary skill in the art, the insert tube may be concentrically maintained within the interior of the substrate tube using one or more O-rings (i.e., such that the insert tube is aligned with the substrate tube's axis of symmetry).

As discussed herein, the insert tube's central portion fits within the discharge end of the substrate tube. Those having ordinary skill in the art will understand that the insert tube may include an additional portion that might be positioned outside of the substrate tube (e.g., a larger-diameter portion positioned outside of the substrate tube at the substrate tube's discharge side). Moreover, it is within the scope of the invention for the insert tube's central portion to embrace non-cylindrical designs. Likewise, it is within the scope of the invention for the insert tube's truncated cone portion (i.e., the insert tube's leading portion) to embrace design variants (e.g., a stepped structure rather than a truncated cone shape). In this regard, the diameter of the truncated cone portion's outer end (i.e., the leading end facing the substrate tube's supply side) must be less than the internal diameter of the substrate tube at the discharge side.

The insert tube is positioned within the substrate tube such that the insert tube's truncated cone portion (i.e., the insert tube's leading portion) faces the substrate tube's supply side and the insert tube's central portion faces the substrate tube's discharge side. The maximum external diameter of the insert tube's central portion is less than the minimum internal diameter of the substrate tube at the discharge side (i.e., the insert tube fits within the substrate tube's interior). Typically, the fit between the substrate tube and the insert tube's central portion is a relatively tight fit. In other words, there is not much clearance between the substrate tube and the insert tube's central portion where the central portion is at its maximum external diameter.

Moreover, the minimum external diameter of the truncated cone portion, which is usually defined at its outer end, is less than the maximum external diameter of the insert tube's central portion. By way of example and as noted, the diameter of the truncated cone portion's outer end is less than the internal diameter of the substrate tube at the discharge side (e.g., less than about 90 percent of the internal diameter of the substrate tube).

During an internal vapor deposition process that employs the insert tube according to the present invention, lower-quality quartz tends to accumulate in a limited area on the interior of the hollow substrate tube, predominately in the region surrounding the insert tube's truncated cone portion. Consequently, the accumulation of low-quality quartz is minimized along the length of the substrate tube. Without being bound to any theory, the present inventors believe that this surprising effect is achieved by the insert tube's special configuration, which causes turbulence in the gas flow near the truncated cone portion of the insert tube within the substrate tube. The deposition of lower-quality quartz will therefore be concentrated in a confined (and thus limited) area of the substrate tube. In this way, a substrate tube is obtained with a "usable" portion (i.e., the length from which optical fiber of a constant quality can be obtained) that is greater than is otherwise achievable in a typical deposition process that does not employ the insert tube of the present invention. As compared with conventional processes, the method of the present invention yields an optical preform having a few more centimeters of usable fiber-drawing length (e.g., 1-2 percent and perhaps 3 percent or so of increased yield).

According to one embodiment of the insert tube, the diameter of the insert tube's truncated cone portion measured at the end facing the substrate tube's supply side, (i.e., at the narrow end of the truncated cone portion) is less than about 0.9× the maximum external diameter of the insert tube's central portion (e.g., between 0.35× and 0.90×). This design ratio has been found to be particularly suitable for concentrating the accumulation of lower-quality quartz to a limited area on the interior surface of the substrate tube.

As a result of the insert tube's truncated cone portion, the deposition of glass layers having a composition essentially different from that of the high-quality glass layers deposited on the substrate tube's middle region (i.e., the translation zone between the energy source's reversal points) is generally confined to the interior of the substrate tube surrounding the insert tube's truncated cone portion.

According to another feature of the present invention, the insert tube is positioned within the substrate tube such that the end of the truncated cone portion that faces the supply side is located outside of the substrate tube region delineated by the reversal point on the substrate tube's supply side and the reversal point on the substrate tube's discharge side (i.e., the truncated cone portion is located closer to the substrate tube's discharge outlet than is the energy source's reversal point on the substrate tube's discharge side).

According to another feature of the present invention, the insert tube itself is hollow, such that the gases (i.e., the glass-forming precursors) that have not been deposited on the interior surface of the hollow substrate tube are discharged through the insert tube and/or the annular space formed between the external diameter (outer surface) of the insert tube's central portion and the internal diameter (i.e., inner surface) of the substrate tube.

According to yet another feature of the present invention, a soot-scraping element (e.g., a rotating bar) can be employed to remove unwanted accumulations that have formed at the end of the substrate tube. Such elements are readily known to those having ordinary skill in the art.

According to the present invention, no cracking of the glass layers deposited on the substrate tube's interior will occur during or after the deposition process. In addition, no formation of bubbles will occur during the collapsing process. Moreover, using the present apparatus, clogging on the substrate tube's discharge side is reduced, leading to a deposition process of longer duration. In addition, the present inventors have found that no undesirable change occurs with respect to the uniformity of the resulting solid preform (i.e., obtained after collapsing the substrate tube), particularly at the substrate tube's discharge side. By using the apparatus of the present invention, it is therefore possible to utilize the high-quality glass material of the substrate tube substantially entirely (i.e., to realize a maximum utilization the substrate tube's length for drawing optical fibers).

As noted, the invention embraces a related method for manufacturing an optical preform via an internal vapor deposition process. In this regard, glass-forming precursors are supplied to a hollow quartz substrate tube at its supply side. Glass-forming precursors that are not deposited on the substrate tube's interior are discharged from its discharge outlet (i.e., at the substrate tube's discharge side).

During the deposition process, an energy source (e.g., a plasma generator) is moved along the length of the hollow substrate tube between a reversal point at the substrate tube's supply side and a reversal point at the substrate tube's discharge side. This produces deposition conditions in the hollow substrate tube. Typically, the energy source is moved in reciprocal translation with respect to the stationary substrate tube. Those having ordinary skill in the art will appreciate, however, that there must simply be relative movement between the energy source and the substrate tube (i.e., the energy source and/or the substrate tube can move).

According to the present invention, an insert tube as previously described is positioned in the interior of the hollow substrate tube. Typically, the insert tube is positioned within the substrate tube such that the insert tube's truncated cone portion faces the substrate tube's supply side and the insert tube's central portion faces the substrate tube's discharge side. As noted, the maximum external diameter of the insert tube's central portion is less than the minimum internal diameter of the substrate tube and greater than the minimum external diameter of the insert tube's truncated cone portion. The latter external diameter is typically defined by the truncated cone portion's outer end, which faces the substrate tube's supply side.

The conditions that prevail in the hollow substrate tube cause the glass-forming precursors to deposit one or more glass layers on the hollow substrate tube's interior surface. Thereafter, a solid preform is obtained by collapsing the hollow substrate tube, which can be provided with additional glass layers on its exterior surface after the internal deposition process according to the present invention. As will be known to those having ordinary skill in the art, optical fibers can be drawn from a heated end of such a solid preform.

In yet another aspect, the present invention embraces a method for manufacturing an optical fiber using a solid preform obtained by performing an internal vapor deposition process according to the present invention.

A following exemplary embodiment of the present invention is described with reference to FIG. 1. This description, however, is merely exemplary in nature and is in no way intended to limit the invention, its application, or uses.

FIG. 1 schematically illustrates an exemplary apparatus according to the present invention. As depicted in FIG. 1, a hollow glass substrate tube 10 is provided with glass-forming precursors (not shown) at its supply side 20, wherein the gas flow (with the glass-forming precursors present therein) travels from left to right. Deposition of the glass-forming precursors is achieved utilizing a resonator (not shown) for generating plasma 40. The resonator is reciprocated along the length of the substrate tube 10 between the supply side 20 and the discharge side 30, at or near their corresponding reversal points indicated by 50 and 60, respectively.

For the sake of completeness, it should be noted that the glass-forming precursors are introduced at the supply side 20 of the substrate tube 10. The axis of symmetry of the substrate tube 10 is indicated at 8.

In one embodiment, the substrate tube 10 and the resonator (not shown) are surrounded by a furnace, with the resonator thus being reciprocated along the length of the substrate tube 10 between the reversal point 50 and the reversal point 60 during the deposition process. As will be known to those having ordinary skill in the art, such a furnace might operate, for example, at about 1100° C. to 1200° C.

Disposed at the discharge side 30 of the substrate tube 10, at a position located outside the area delineated by the reversal point 50 and reversal point 60, is an insert tube 1. This insert tube 1, which is made of quartz, includes a truncated cone portion 3 and a central portion 4. The insert tube 1 is thus positioned within the interior of the substrate tube 10 such that the external diameter of the central portion 4, which is indicated at 5, is smaller than the internal diameter of the substrate tube 10 near the discharge side 30.

It is in particularly desirable that the external diameter of the truncated cone portion 3 near its outer end, which is indicated at 9, is between 35 percent and 90 percent of the external diameter of the central portion 4. As a result of the conical shape of the insert tube 1, schematically depicted such that the truncated cone portion 3 faces the supply side 20, the distance over which inferior quality glass will be deposited on the interior of the hollow substrate tube 10 near the reversal point 60 (i.e., at discharge side 30) will be small compared to either an embodiment in which the insert tube 1 is altogether missing or an embodiment in which an insert tube 1 is not provided with an end having a truncated cone portion 3.

During plasma chemical vapor deposition (PCVD) process, a resonator is moved a length of about 1.3 meters along the substrate tube 10. Such a resonator for generating plasma 40 reciprocates (i.e., in translation) between the reversal point 50 and the reversal point 60.

A solid optical preform is subsequently obtained by collapsing the hollow substrate tube 10, which may have been provided with additional glass layers on its exterior surface after the internal deposition process. The optical preform is then mounted in a drawing tower for obtaining (i.e., drawing) an optical glass fiber therefrom while supplying heat to one end of the optical preform. The total length of the high-quality glass fiber thus obtained corresponds essentially to the entire central portion of the substrate tube 10, more specifically to the region between the reversal point 50 near the supply side 20 and the reversal point 60 near the discharge side 30.

This application incorporates entirely by reference the following commonly assigned U.S. patent documents, each of which pertains to optical preforms: U.S. Patent Application Publication No. US 2002/0097774 A1 and its related U.S. patent application Ser. No. 09/986,903 for a Device and Method for Manufacturing a Preform, filed Nov. 13, 2001, now U.S. Pat. No. 6,600,769; U.S. Patent Application Publication No. 2003/0164007 A1 and its related U.S. patent application Ser. No. 10/328,005 for a Method for Collapsing a Hollow Substrate Tube into a Rod-Like Preform While Heating, filed Dec. 26, 2002; U.S. Patent Application Publication No. 2004/0163417 A1 and its related U.S. patent application Ser. No. 10/725,426 for a Method of Manufacturing an Optical Fibre, filed Dec. 3, 2003; U.S. Patent Application Publication No. 2004/0237593 A1 and its related U.S. patent application Ser. No. 10/489,434 for a Method for Depositing One or More Glass Layers on the External Surface of a Glass Preform, filed Mar. 11, 2004; U.S. Patent Application Publication No. US 2005/0120751 A1 and its related U.S. patent application Ser. No. 10/959,331 for a Method for Manufacturing a Preform for Optical Fibres, as well as a Method for Manufacturing Optical Fibres, filed Oct. 7, 2004; U.S. Patent Application Publication No. US 2007/0003197 A1 and its related U.S. patent application Ser. No. 10/509,684 for a Method and Device for Manufacturing Optical Preforms, as well as the Optical Fibres Obtained Therewith, filed Jul. 21, 2006; U.S. Patent Application Publication No. US 2008/0031582 A1 and its related U.S. patent application Ser. No. 11/627,483 for a Method for Manufacturing an Optical Fiber Preform, filed Jan. 26, 2007; U.S. Patent Application Publication No. US 2007/0289532 A1 and its related U.S. patent application Ser. No. 11/762,959 for an Apparatus for Effecting Plasma Chemical Vapor Deposition (PCVD), filed Jun. 14, 2007; U.S. Patent Application Publication No. US 2008/0044150 A1 and its related U.S. patent application Ser. No. 11/775,542 for a Method for Making an Optical Fiber Preform via Internal Vapor Deposition, filed Jul. 10, 2007; U.S. Patent Application Publication No. US 2008/0063812 A1 and its related U.S. patent application Ser. No. 11/851,595 for a Method for Manufacturing an Optical Preform, filed Sep. 7, 2007; and U.S. patent application Ser. No. 11/939,931 for an Apparatus and Method for Performing a PCVD Process, filed Nov. 14, 2007.

In the specification and FIGURE, typical embodiments of the invention have been disclosed. The present invention is not limited to such exemplary embodiments. Unless otherwise noted, specific terms have been used in a generic and descriptive sense and not for purposes of limitation.

The invention claimed is:

1. An apparatus for manufacturing an optical preform via an internal vapor deposition process, comprising:
   a hollow quartz substrate tube having (i) a supply side through which glass-forming precursors are supplied to the interior of said substrate tube and (ii) a discharge side from which glass-forming precursors that have not been deposited on the interior of said substrate tube are discharged;
   an energy source that is movable relative to the length of said substrate tube between a reversal point at said substrate tube's supply side and a reversal point at said substrate tube's discharge side;
   wherein the improvement comprises an insert tube having a central portion and a truncated cone portion, the maximum external diameter of said central portion being less than the minimum internal diameter of said substrate tube and greater than the minimum external diameter of said truncated cone portion;
   wherein said insert tube is disposed within the interior of said substrate tube, said insert tube being positioned at the discharge side of said substrate tube such that said truncated cone portion faces said substrate tube's supply side and said central portion faces said substrate tube's discharge side.

2. An apparatus according to claim 1, wherein the minimum external diameter of said truncated cone portion is less than about 0.9× of the maximum external diameter of said central portion.

3. An apparatus according to claim 1, wherein the minimum external diameter of said truncated cone portion is between 0.35× and 0.9× of the maximum external diameter of said central portion.

4. An apparatus according to claim 3, wherein the minimum external diameter of said truncated cone portion is defined at said truncated cone portion's outer end, which faces said substrate tube's supply side.

5. An apparatus according to claim 1, wherein the diameter of said truncated cone portion's outer end is less than about 90 percent of said substrate tube's minimum internal diameter.

6. An apparatus according to claim 1, wherein said insert tube is positioned outside the region delineated by the reversal point at said substrate tube's supply side and the reversal point at said substrate tube's discharge side.

7. An apparatus for making an optical preform, comprising:
   a glass substrate tube having a supply side through which glass-forming precursors may be supplied to said substrate tube's interior and a discharge side; and
   an insert tube having a leading portion and a central portion, wherein (i) said insert tube is at least partly positioned within said substrate tube's interior near said substrate tube's discharge side, (ii) said insert tube's leading portion faces said substrate tube's supply side, and (iii) the minimum external diameter of said insert tube's leading portion is less than the maximum external diameter of said insert tube's central portion.

8. An apparatus according to claim 7, wherein the diameter of said leading portion's outer end is less than about 90 percent of said substrate tube's minimum internal diameter at said substrate tube's discharge side.

9. An apparatus according to claim 7, wherein said insert tube's leading portion comprises a truncated cone, the minimum external diameter of said truncated cone being defined at its outer end, which faces said substrate tube's supply side.

10. An apparatus according to claim 9, wherein the diameter of said truncated cone's outer end is between 0.35× and 0.9× of the maximum external diameter of said insert tube's central portion.

11. An apparatus according to claim 7, further comprising a plasma-generating energy source that, relative to the length of said substrate tube, reciprocates between a reversal point at said substrate tube's supply side and a reversal point at said substrate tube's discharge side.

12. An apparatus according to claim 11, wherein said insert tube is positioned outside the region delineated by the reversal point at said substrate tube's supply side and the reversal point at said substrate tube's discharge side.

13. An internal vapor deposition method for manufacturing an optical preform, comprising:
   providing a hollow quartz substrate tube having (i) a supply side through which glass-forming precursors are supplied to the substrate tube's interior and (ii) a discharge side from which glass-forming precursors that have not been deposited on the substrate tube's interior are discharged;
   providing an insert tube having a central portion and a truncated cone portion, the maximum external diameter of the central portion being less than the minimum internal diameter of the substrate tube and greater than the minimum external diameter of the truncated cone portion;
   placing the insert tube (iii) within the substrate tube's interior and (iv) at the substrate tube's discharge side such that the truncated cone portion faces the substrate tube's supply side and the central portion faces the substrate tube's discharge side;
   supplying glass-forming precursors to a substrate tube at its supply side; and
   generating glass-deposition conditions within the substrate tube by moving an energy source along the length of the substrate tube between a reversal point at the substrate tube's supply side and a reversal point at the substrate tube's discharge side.

14. A method according to claim 13, wherein the minimum external diameter of the truncated cone portion is less than about 0.9× of the maximum external diameter of the central portion.

15. A method according to claim 13, wherein the minimum external diameter of the truncated cone portion is between 0.35× and 0.9× of the maximum external diameter of the central portion.

16. A method according to claim 13, wherein the minimum external diameter of the truncated cone portion is defined at the truncated cone portion's outer end, which faces the substrate tube's supply side.

17. A method according to claim 13, wherein the diameter of the truncated cone portion's outer end is less than about 90 percent of the substrate tube's minimum internal diameter at the substrate tube's discharge side.

18. A method according to claim 13, wherein the insert tube is positioned outside the region delineated by the reversal point at the substrate tube's supply side and the reversal point at the substrate tube's discharge side.

19. A method according to claim 13, wherein the energy source comprises a plasma generator.

20. A method according to claim 13, further comprising, after depositing glass layers on the substrate tube's interior, removing the insert tube from the substrate tube and collapsing the substrate tube into a solid preform.

21. A method according to claim 20, further comprising heating the solid preform at one end and drawing an optical fiber therefrom.

* * * * *